(12) United States Patent
Buffa (10) Patent No.: US 7,131,694 B1
(45) Date of Patent: Nov. 7, 2006

(54) ADJUSTABLE LUMBAR SUPPORT FOR VEHICLE SEAT

(76) Inventor: John A. Buffa, 49539 Nautical, Chesterfield, MI (US) 48047

( * ) Notice: Subject to any disclaimer, the term of this patent is extended or adjusted under 35 U.S.C. 154(b) by 0 days.

(21) Appl. No.: 11/118,662

(22) Filed: Apr. 29, 2005

(51) Int. Cl.
*A47C 7/46* (2006.01)
(52) U.S. Cl. .................................... 297/284.4
(58) Field of Classification Search ............. 297/284.4, 297/284.1
See application file for complete search history.

(56) References Cited

U.S. PATENT DOCUMENTS

| | | | |
|---|---|---|---|
| 5,217,278 A | 6/1993 | Harrison et al. | |
| 5,299,851 A * | 4/1994 | Lin | 297/284.5 |
| 5,651,583 A * | 7/1997 | Klingler et al. | 297/284.4 |
| 5,911,477 A | 6/1999 | Mundell et al. | |
| 6,036,265 A | 3/2000 | Cosentino | |
| 6,334,651 B1 | 1/2002 | Duan et al. | |
| 6,520,580 B1 | 2/2003 | Hong | |
| 6,666,511 B1 | 12/2003 | Schuster et al. | |
| 6,668,679 B1 * | 12/2003 | McMillen | 74/500.5 |
| 6,688,687 B1 * | 2/2004 | Chu | 297/284.4 |
| 6,820,933 B1 * | 11/2004 | Fereira Da Silva | 297/284.1 |
| 2002/0195854 A1 | 12/2002 | Hong | |
| 2004/0066071 A1 | 4/2004 | Schuster, Sr. et al. | |
| 2004/0080197 A1 | 4/2004 | Kopetzky | |

* cited by examiner

*Primary Examiner*—Milton Nelson, Jr.
(74) *Attorney, Agent, or Firm*—Burgess Law Office, PLLC (57) ABSTRACT

An adjustable lumbar support mechanism located in a seat back of a vehicle seat for supporting the lower back of a seat occupant. The lumbar support mechanism generally includes a lumbar support member supported on a frame within the seat back. The support member includes a sheet or panel formed of a resilient material. The panel including a plurality of openings located therein. A rib extending on the rear surface of the panel helps to control and provide rigidity to the support member. A seat occupant utilizes an actuator, coupled by an adjustment cable to the support member, to adjust the curvature and thereby vary support provided by the lumbar support mechanism.

23 Claims, 7 Drawing Sheets

ADJUSTABLE LUMBAR SUPPORT FOR VEHICLE SEAT

BACKGROUND OF THE INVENTION

1. Field of the Invention

The present invention pertains to a lumbar support for use with a seat; more particularly, to an adjustable lumbar support used in a vehicle seat.

2. Description of Related Art

Automobile manufacturers, in a continued attempt to provide comfort to vehicle occupants, now provide adjustable vehicle seats that enable an operator or seat occupant to increase comfort and accessibility to vehicle controls by varying the seat position. One of the many features now included in an automotive seat is an adjustable lumbar support located in the seat back. The lumbar support supports the lumbar region of a seat occupant's back.

The design of lumbar support mechanisms installed in vehicles seats has changed over time. Many of these mechanisms are complex and require a multitude of components. Such mechanisms often include a flexible support member formed of a plurality of resilient axial members with a multitude of transverse members connected thereto. The flexible support member is mounted in the seat back. An actuator mounted in the vehicle such that it is accessible to the seat occupant is connected to the flexible support member and operates to flex or bend the flexible support member to adjust its shape or curvature. Accordingly, the seat occupant adjusts the shape or curvature of the flexible support member to achieve the desired level of lumbar support.

As with many mechanical devices, more parts typically results in a more complex device that usually costs more to manufacture and is often more difficult to assemble and install. In addition, as the number of parts or complexity of a device increases the possibility that the device may ultimately break or fail usually increases. Increased occurrences of failure results not only in consumer dissatisfaction, they also increase overall costs resulting from repair or warranty concerns.

Accordingly, it is desirable to have a cost-efficient, simple and durable lumbar support mechanism that is easily installed in a vehicle seat utilizing an actuator assembly that easily adjust the position of the lumbar support member to provide support to the lumbar region of a seat occupants back.

SUMMARY OF THE INVENTION

The present invention is a lumbar support mechanism for use with a seat. The mechanism includes a support member including a panel having an upper and lower end and a rear surface. A rib located on the rear surface projects outward from the rear surface of the panel. The rib is located on a line extending between the upper end and lower end of the panel. The support member is mounted to a guide structure. The guide structure includes upright leg members. An actuator is connected or coupled to the support member through an adjustment cable wherein one end of the cable is connected to the actuator and the other end of the cable is connected to the support member. Accordingly, the actuator operates to position the support member in a multitude of positions to vary the degree or amount of support provided to the seat occupant.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and, thus, variations that do not depart from the gist of the invention are intended to be within the scope of the invention. Such variations are not to be regarded as a departure from the spirit and scope of the invention.

Figure 1:
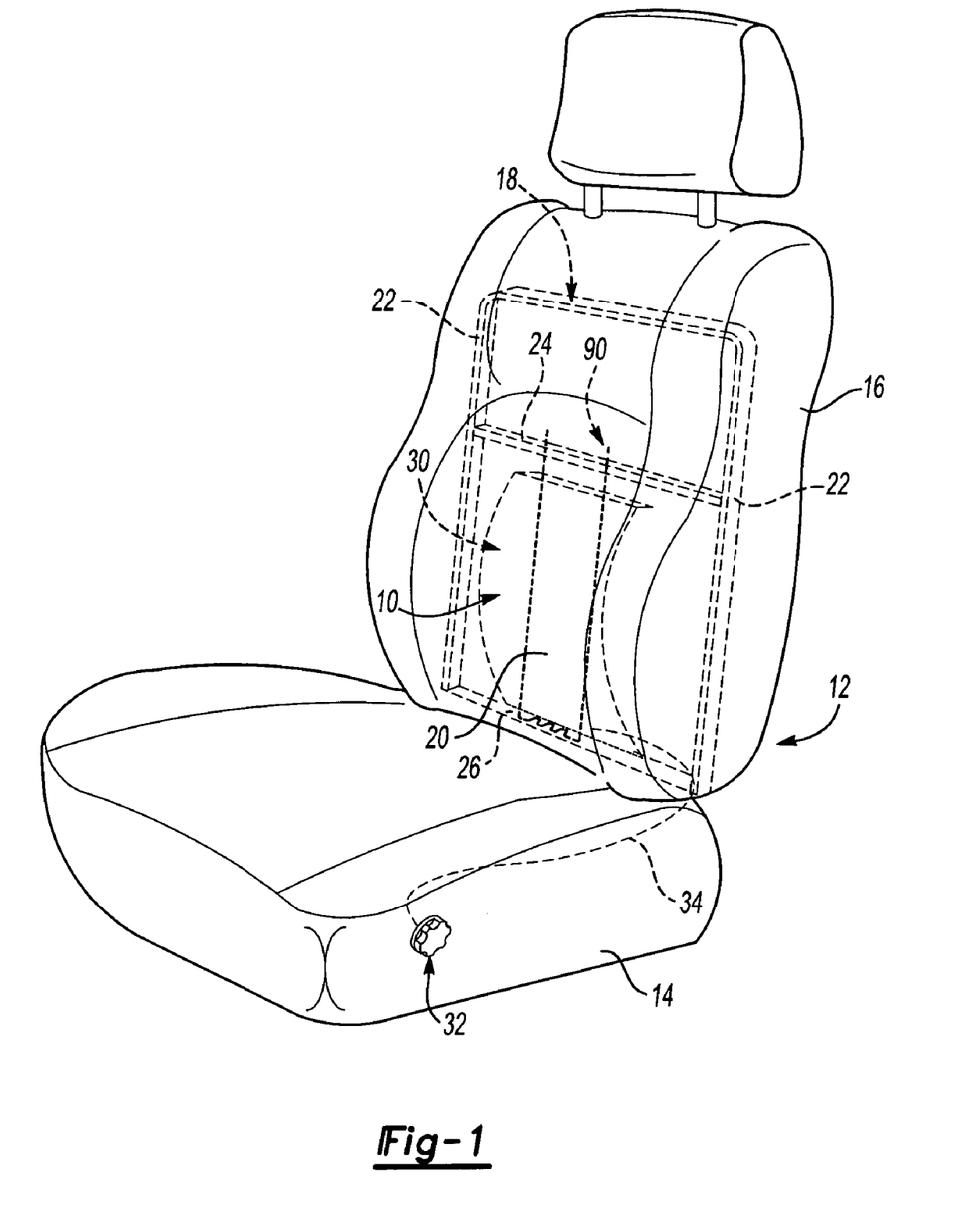
FIG. 1 is a schematic view showing a lumbar support mechanism according to the present invention located in a vehicle seat.

FIG. 1 illustrates a lumbar support mechanism, seen generally at 10, according to the present invention located in a vehicle seat 12. The vehicle seat 12 includes a seat bolster 14 and a seat back 16. The seat back 16 includes a seat frame 18, which is connected, typically in a pivotal manner, to the seat bolster 14. A plurality of upright 22 members cooperate with upper 24 and lower 26 cross bars to form the seat frame 18.

The lumbar support mechanism 10 generally includes a lumbar support member 30. The lumbar support member 30 is supported in the seat back 16 by the upper 24 and lower 26 cross bars of the seat frame 18. The lumbar support member 30 positions or moves the lower seating surface 20 of the seat back 16 to provide support to the lumbar region of a seat occupant. Secured to the seat bolster 14 is an actuator 32. The actuator 32 acts through an adjustment cable 34 to position the lumbar support member 30. The seat occupant uses the actuator 32 to vary the position of the lumbar support member 30 and consequently vary the amount of lumbar support provided at the lower seating surface 20.

Figure 2:
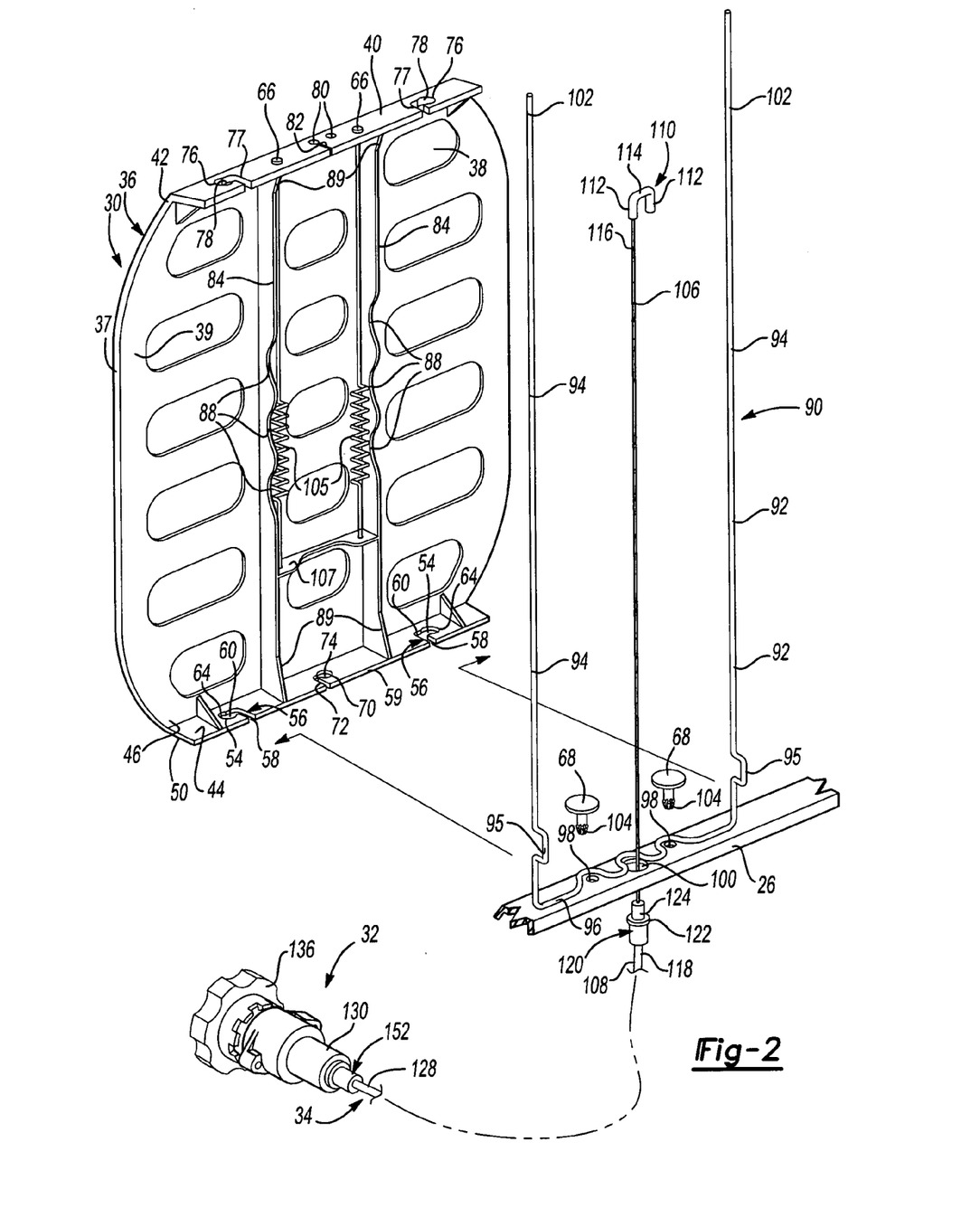
FIG. 2 is an exploded perspective view of a lumbar support mechanism according to the present invention.
Figure 3:
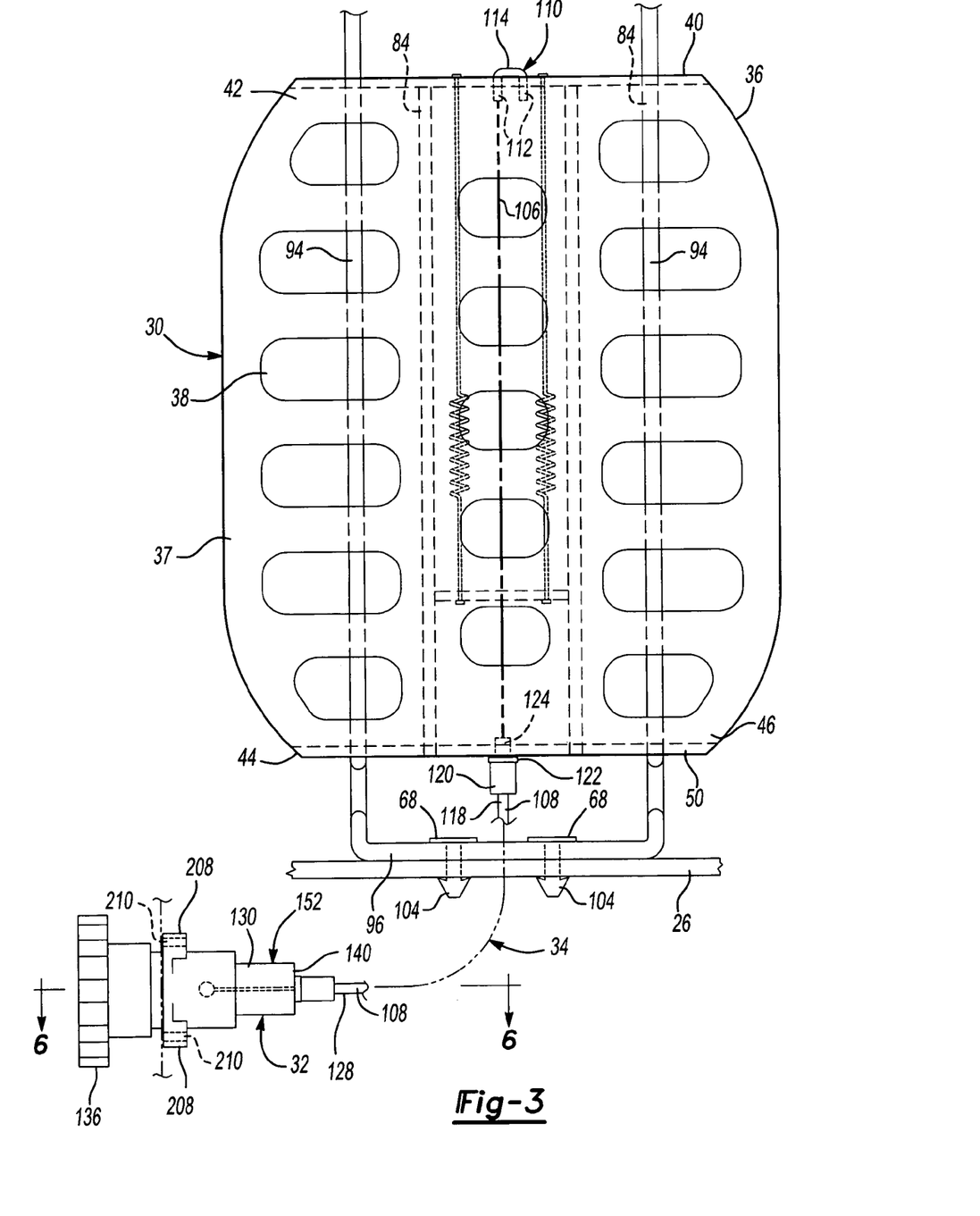
FIG. 3 is a front view of a lumbar support mechanism according to the present invention.
Figure 4:
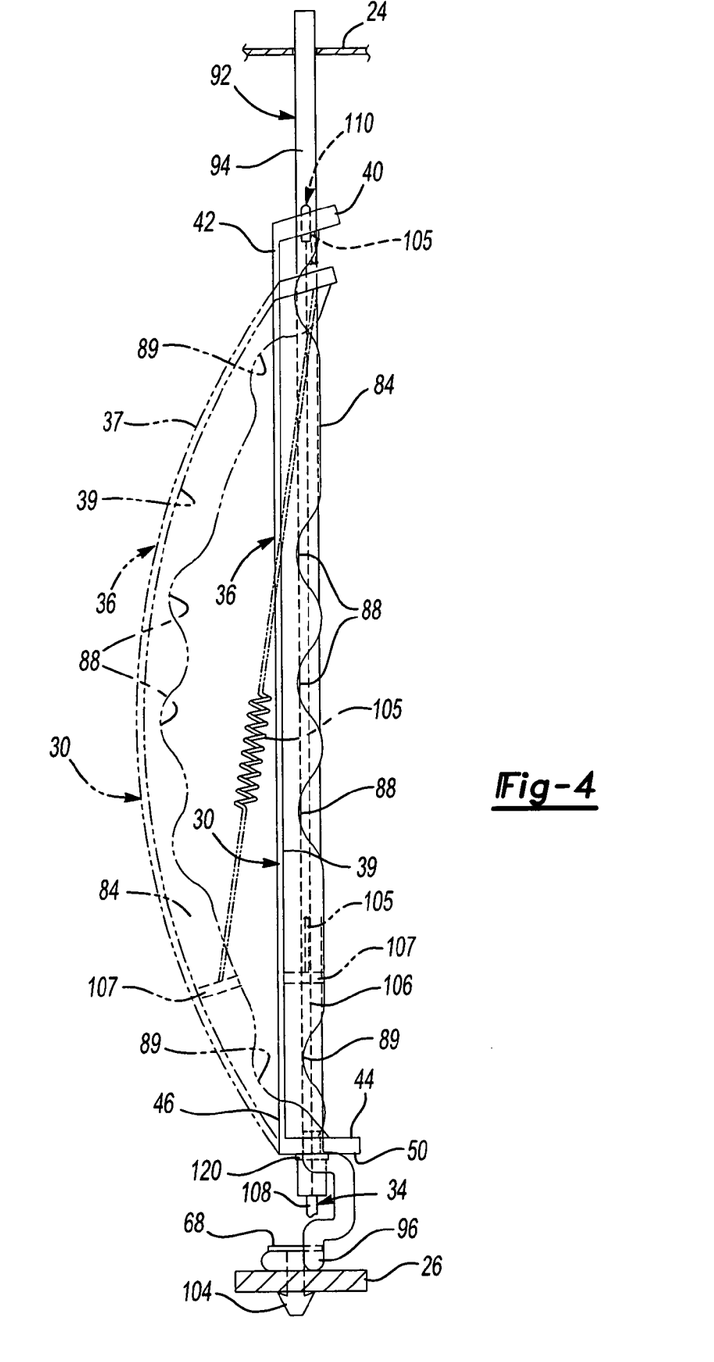
FIG. 4 is a side view of the lumbar support of FIG. 3.

As shown in FIGS. 2–4, the lumbar support member 30 includes a sheet or panel 36 made of a resilient material, such as a resilient plastic, having a front surface 37 and a rear surface 39. The front surface 37 being that surface that engages or protrudes outward against the lower seating surface 20. The resilient material forming the sheet or panel 36 has suitable spring back or resilient properties that urge the panel 36 to return to its initial position. While disclosed herein as a panel, the shape and thickness of the panel 36 can vary across or over the dimensions of the panel 36 to vary the spring back or resiliency of the panel 36 in different regions or areas of the panel 36. Accordingly, when at rest or in its initial position, the sheet or panel 36 is in the position shown in FIG. 2.

The panel 36 includes a plurality of openings 38 located therein. The openings 38 remove a portion of the material of the panel 36 giving the panel 36 a web-type configuration or shape. The openings 38 help to reduce the rigidity of the panel 36 and to control the flexibility and bending stresses occurring in the panel 36 during use of the lumbar support member 30. Accordingly, the openings 38 may vary in shape, size and pattern depending upon the type, size and shape of the material used to form the lumbar support member 30. In addition, varying the size of the openings 38 adjusts the flexibility and bending stresses in different regions or areas of the panel 36.

An upper flange 40 is located on the upper end 42 of the lumbar support member and a lower flange 44 is located at the lower end 46 of the lumbar support member 30. Both the upper and lower flanges 40, 44 extend rearward from the rear surface 39. That is, the flanges 40, 44 extend inward toward the seat frame 18 and away from the lower seating surface 20. The lower flange 44 also includes a mounting surface 50 located on the underside or bottom of the lower flange 44.

Mounting apertures 54 are located in the lower flange 44. Each mounting aperture 54 includes an L-shaped slot 56 having a leg portion 58 extending inwardly from the face 59 of the lower flange 44. A base portion 60 of the slot 56 extends parallel to the face 59 and terminates at a cylindrically shaped seat 64. An additional aperture 70 extends through the lower flange 44. The aperture 70 includes an L-shaped slot 72 terminating at a cylindrical seat 74.

The upper flange 40, like the lower flange 44 also includes mounting apertures 76 having L-shaped slots 77 terminating at cylindrical seats 78. The upper flange 40 further includes a pair of apertures 80 with a slot 82 extending to one of the apertures 80. In addition, the upper flange 40 includes apertures 66 for securing a spring member 105 to the upper flange 40.

Ribs 84 protrude outward from the rear surface 39 of the lumbar support member 30. The ribs 84 generally lie on a line extending between the upper flange 40 and the lower flange 44. While shown herein extending from the upper flange 40 to the lower flange 44, the ribs 84 may also end prior to reaching the ends 42, 46 of the lumbar support member 30. In addition, the ribs 84 may extend at an angle with respect to the upper 40 and lower 44 flanges. In addition, while shown as a single member having a rectangular cross-section, the ribs 84 may have various shapes and configurations.

When viewed from the side the ribs 84 have a plurality of indentations or relieved areas 88 extending along a portion of the length of the ribs 84. As shown in FIG. 2, the indentations 88 have a sinusoidal pattern and are located generally near the center or a midpoint of the ribs 84. Gussets 89 extending from the ribs 84 to the upper and lower flanges 40, 44 provide additional support to the panel 36. The ribs 84 provide rigidity and support to the lumbar support member 30. The indentations 88 provide flexibility to the panel 36 and enable the lumbar support member 30 to flex or bend without reducing support. Therefore, the shape, configuration and design of the ribs 84 are variable or depending upon the particular design parameters of the lumbar support member 30. Thus, the ribs 84, indentations 88, gussets 89, openings 38, material type, shape, size and configuration of the panel 36 all cooperate to determine and control the resiliency and flexibility of the lumbar support member 30.

As shown in FIGS. 2–4 the lumbar support member 30 is mounted on a guide structure 90. The guide structure 90 includes a frame 92 having a pair of upright leg members 94 interconnected by a base member 96. Each leg member 94 having a bend or deflected portion 95 located near the base member 96. The base member 96 of the preferred embodiment has a sinuous shape or serpentine configuration. As shown in the present embodiment, a continuous member, such as a rod, formed into a desired shape and configuration depending upon the particular configuration of the seat back 16 and the size and shape of the lumbar support member 30 forms the frame 92.

As shown herein, seated on the lower cross bar 26 of the seat frame 18 is the base member 96 of the frame 92. The serpentine configuration is such that it extends or is located adjacent to but does not cover the apertures 98 located in the lower cross bar 26. The apertures 98 are used to attach the guide structure 90 to the lower cross bar 26. The middle or center aperture 100 provides clearance for the adjustment cable 34 and enables the adjustment cable 34 to pass through the lower cross bar 26 of the seat frame 18. The upper ends 102 of the leg members 94 extend upward and are attached to the upper cross bar 24 of the seat frame 18. This may include extending the upper ends 102 of the legs 94 through apertures in the upper cross bar 24 and securing them to the upper cross bar 24 after attaching the base member 96 to the lower cross bar 26.

As illustrated in FIG. 3, fasteners 68 extending through the apertures 98 in the lower cross bar 26 secure the frame 92 to the lower cross bar 26. The fasteners 68 are of a type commonly referred to as a Christmas tree fastener, in that the fasteners 68 have a barbed end or projection 104 that deflects inward when the fastener 68 is inserted in to the apertures 98. Upon passing through the apertures 98, the barbed end 104 of each fastener 68 extends outward and engages the undersurface of the lower cross bar 26. Accordingly, the frame 92 is secured on both ends to the seat frame 22 with the upper ends 102 attached to the upper cross bar 24 and a base member 96 of the frame 92 attach to the lower cross bar 26.

To attach the lumbar support member 30 to the frame 92 the leg members 94 are deflected slightly inward, toward one another, and are slid into the leg portion 58 of the L-shaped slot 56 located in the lower flange 44 of the lumbar support member 30. Upon reaching the base portion 60 of the slot 56 the leg members 94 are urged outward until they enter into and are seated in the respective cylindrical seats 64 of the mounting apertures 54 located in the lower flange 44. The cylindrical seats 64 are sized such that the lower flange 44 of the lumbar support member 30 slides freely on the leg members 94 of the frame 92. As illustrated in FIG. 4, the lumbar support 30 rests on the bend or deflected portion 95 that functions as a stop to limit the lower travel of the lumbar support 30 on the frame 92.

The upper end 42 of the lumber support member 30 is attached, in part, in a similar manner by again deflecting the leg members 94 of the frame 92 slightly inward and inserting them into the L-shaped slots 77. The leg members 94 slide in the slots 77 until they reach the respective cylindrical seats 78. The cylindrical seats 78 are sized such that the upper flange 40, and correspondingly the upper end 42, of the lumbar support member 30 moves freely along the leg members 94 of the frame 92.

The adjustment cable 34, such as a flexible motion transmitter or push pull type cable, includes a wire or cable 106 that slides within a cable housing 108, and is shown in the preferred embodiment as one way to adjust the curvature of the lumbar support member 30. This type of cable is often referred to as a Bowden cable. As shown in FIG. 2, a hook 110 is fastened to a first end 116 of the cable 106. The hook 110 has a U-shape wherein the legs 112 fit in the apertures 80 and the base 114 engages the upper flange 40. The cable 106 fits in the slot 82 adjacent the aperture 80.

The cable housing 108 includes an end fitting or ferrule 120 secured to the first end 118 of the cable housing 108. As shown in FIGS. 2–4, the U-shaped hook 110 end and fitting 120 pass through the opening or aperture 100 in the lower cross bar 26. The end fitting 120 includes a shoulder 122 of a diameter sized such that the first end 118 of the cable housing 108 engages and remains stationary against the lower flange 44 of the lumbar support 30. Specifically, a bushing portion 124 extends through the aperture 74 in the lower flange 44 and the shoulder 122 is seated against the lower or undersurface 50 of the lower flange 44. Thus, the first end 118 of the cable housing 108 is positioned on the lower flange 44 while the cable 106 and the hook 110 pass through and engage the upper flange 40 of the lumbar support member 30. Accordingly, as the cable 106 is pulled or placed in tension, it compresses the lumbar support member 30 by drawing the upper flange 40 of the lumbar support member 30 downward along the frame 92 toward the lower flange 44 causing the lumbar support member 30 to bow outward in the direction of the lower seating surface 20, see FIG. 4. Thus, drawing the upper flange 40 downward increases the outward deflection of the lumbar support member 30.

As set forth previously, a further aspect of the invention includes a tension member that operates to reduce the force necessary to move the support member 30 outward as shown in phantom in FIG. 4. In the preferred embodiment, positioned on the rear surface 39 of the panel 36 between the ribs 84 is a spring bracket 107. A pair of tensile springs 105 are attached on a first end to the spring bracket 107. The second end of the springs 105 are attached to the upper flange 40 at mounting holes 66. In keeping with the invention, varying the position of the spring bracket 107 on the support member 30 varies the applied force. In addition, varying the number or tensile strength of the springs 105 also varies the applied force.

It should be understood that the cable 106 could be tightened by several different methods, all of which can provide a suitable means to correspondingly move the upper flange 40 of the lumbar support member 30 and vary the amount or degree of curvature of the lumbar support member 30.

Figure 5:
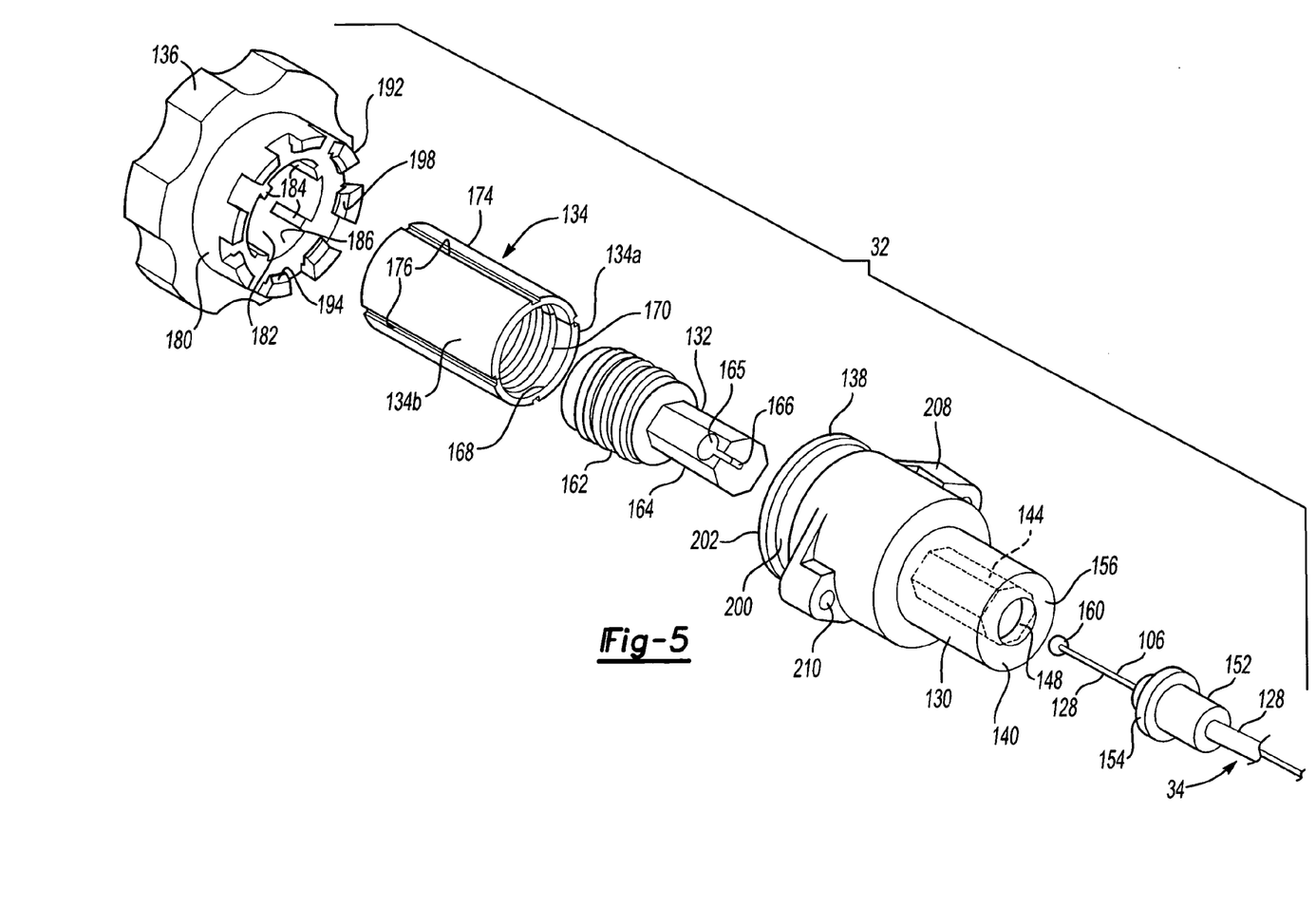
FIG. 5 is an exploded perspective view of an actuator for use with the lumbar support mechanism according to the present.
Figure 6:
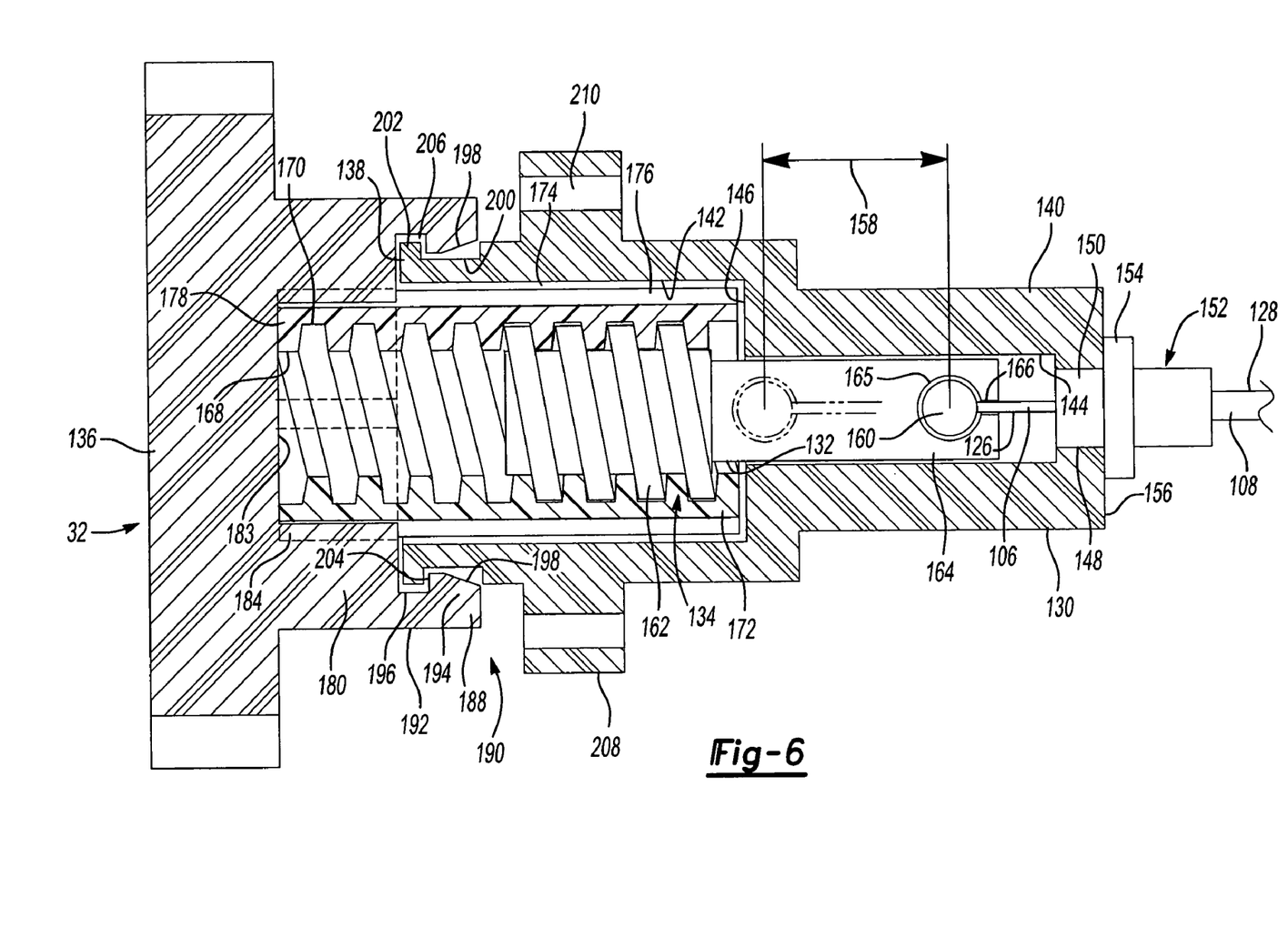
FIG. 6 is a sectional view taken along lines 6—6 of FIG. 3.
Figure 7:
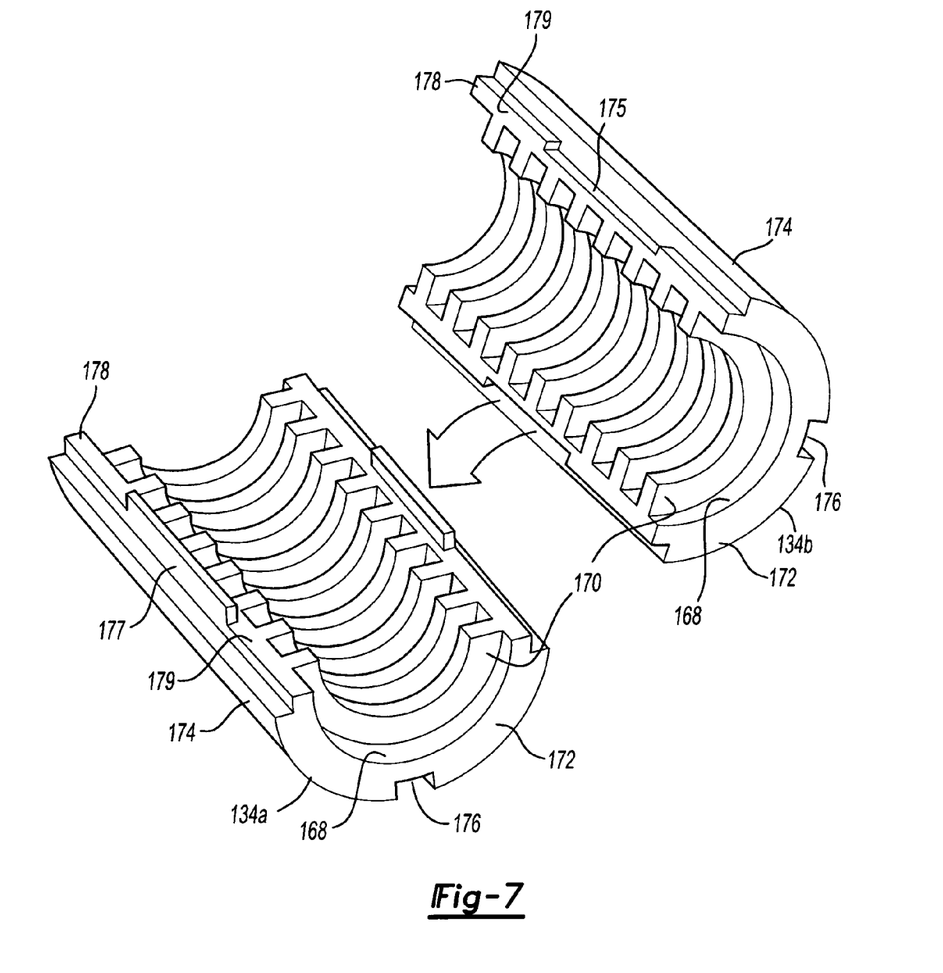
FIG. 7 is in exploded perspective view of a shell for use with the actuator of the present invention illustrated in FIG. 5.

FIGS. 5–7 illustrate a preferred embodiment of the actuator 32. The actuator 32 tightens or loosens the cable 106 and correspondingly varies the degree of curvature of the lumbar support member 30. As shown in FIG. 5, the actuator 32 includes a housing 130, screw member 132, shell 134, formed of two sections 134a, 134b, and knob 136. These components fit together such that rotation of the knob 136 causes axial movement, in the direction of the arrow 158, of the screw member 132 in the housing 130 to increase or decrease the tension on the cable 106.

Turning now in greater detail to the actuator 32, the housing 130 has first and second ends 138, 140. The first end 138 having a cylindrical bore 142 extending from the first end 138 toward the second end 140. The cylindrical bore 142 terminates prior to reaching the second end 140 of the housing 130. A cylindrical bore 142 toward the second end 140 of the housing 130. An aperture 148 is located in the second end 140 of the housing 130 and communicates with the shaped passageway or socket 144.

The aperture 148 is sized to receive a bushing portion 150 of a ferrule or end fitting 152 attached to the second end 128 of the cable housing 108. The end fitting 152 further includes a shoulder 154. The shoulder 154 is sized to provide a stop on the outer face 156 of the second end 140 of the housing 130. Accordingly, the first end 118 of the cable housing 108 is connected by the first end fitting 120 to the lower flange 44 of the support member 30 and the second end 128 of the cable housing 108 is connected by the second end fitting 152 to the housing 130 of the actuator 32.

The second end 126 of the wire or cable 106 has a ball 160 staked thereto. The ball 160 and cable 106 pass through the aperture 148 located in the second end 140 of the housing 130. Accordingly, the ball 160 and cable 106 to extend through the aperture 148 and are received in the screw member 132.

As illustrated, the screw member 132 has a threaded cylindrical portion 162 and a post portion 164. The post portion 164 is configured such that it has a cross sectional shape, illustrated in the preferred embodiment as a hexagon, that is complementary to the cross sectional shape of the shaped passageway or socket 144. The complementary cross sectional shape of the socket 144 and the post portion 164 enables the screw member 132 to move longitudinally within the housing 130 and prevents rotation about the longitudinal axis or direction of movement of the screw member 132 as illustrated by the arrow 158 in FIG. 6.

The ball 160 staked to the cable 106 connects the cable 106 to the screw member 132. The ball 160 fits in a cylindrical seat 165 located in the post portion 164. A slot or groove 166 located in the post portion 164 receives the cable 106. Accordingly, as the screw member 132 moves longitudinally within the housing 130, in the direction of the arrow 158, the screw member 132 functions to increase or decrease the tension on the cable 106 and correspondingly adjusts the degree of curvature or outward bow of the lumbar support member 32.

The shell 134 is cylindrically shaped and sized to fit within the cylindrical bore 142 of the housing 130. The inner circumferential surface 168 of the shell 134 includes a plurality of threads 170. The threads 170 are complementary to and engage the cylindrical threaded portion 162 of the screw member 132. The distal end 172 of the shell 134 is positioned adjacent the bottom 146 of the bore 142. The outer circumferential surface 174 of the shell 134 includes a plurality of longitudinally extending grooves 176.

The knob 136 includes an annular flange 180 defining a cylindrical socket 182 of a size and diameter suitable to receive the shell 134. The socket 182 has a bottom surface 183. Tabs 184 project radially inward from an inner circumferential surface 186 of the socket 182. As shown in FIG. 6, when the shell 134 is disposed within the cylindrical bore 142 of the housing 130, the proximal end 178 of the shell 134 is located adjacent the bottom surface 183 of the socket 182 with the tabs 184 fitting within the grooves 176 located in the outer circumferential surface 174 of the shell 134. Accordingly, the shell 134 is coupled or connected to the knob 136 such that rotation of the knob 136 causes rotation of the shell 134 within the cylindrical bore 142 of the housing 130. As shown, the shell 134 is secured between the bottom 183 of the socket 182 and the bottom 146 of the cylindrical bore 142.

In the embodiment illustrated in FIG. 7, the shell 134 is shown as a split shell, formed of two opposed semicircular sections 134a, 134b. These sections 134a, 134b fit on opposite sides of the screw member 132. Each of the first and second shell sections 134a, 134b includes a corresponding mating surface 179. To maintain proper alignment of the threads 170 when the respective shell sections 134a, 134b are placed together, a pair of locating tabs 177 extending upward from the mating surface 179 of the first shell section 134a engage a pair of locating grooves 175 formed in the mating surface 179 of the second shell section 134b. The tabs 179 and grooves 175 prevent the respective first and second shell sections 134a, 134b from moving longitudinally and creating a gap or misalignment of the threads 170. Forming the shell 134 in sections reduces manufacturing and assembly time. The shell 134 may be made as a single or unitary member wherein the threads 170 are cut or machined therein.

The knob 136 further includes a latch assembly, seen generally at 190, that rotatably secures the knob 136 to the housing 130. The latch assembly 190 includes a plurality of locking fingers 192 formed on the outer end 188 of the annular flange 180. Each locking finger 192 includes an inwardly facing locking projection 194 adjacent an outwardly extending annular groove 196. A ramp surface 198 is formed on the leading end of the locking projection 194.

An inwardly extending annular groove 200 is located on the outer circumferential surface of the housing 130 near the second end 140 of the housing 130. The annular groove 200 cooperates with the second end 140 of the housing 130 to define an annular flange 202 formed on or located at the first end 138 of the housing 130. The annular flange 202 having a width or thickness less than the width or thickness of the annular groove 196 located in the knob 136.

To rotatably couple the knob 136 to the housing 130, the knob 136 is placed adjacent the housing 130 such that the ramp surface 198 of the locking projection 194 engages the annular flange 202 of the housing 130. Applying a suitable force to the knob 136 causes the locking projection 194 to deflect outward as the ramp surface 198 travels over the annular flange 202. Once the locking projection 194 travels past the annular flange 202, it snaps inwardly into the annular groove 196 located in the housing 130. Accordingly, the knob 136 is retained on the housing 130 as the locking surface 204 of the locking projection 194 engages the wall or corresponding locking surface 206 of the annular flange 202. As set forth previously, the size of the respective grooves, flanges and spacing is such that the knob 136 is coupled to and rotates freely about the housing 130.

A pair of ears 208 having mounting apertures 210 are connected to or formed integral with the housing 130. Mounting screws or fasteners extend through the mounting apertures 210 and secure the housing 130 to the seat bolster 14 at a location adjacent to the vehicle operator.

Accordingly, rotation of the knob 136 of the present invention correspondingly rotates the shell 134 causing longitudinal travel of the screw member 132 between first and second positions, as shown by the arrow 158 in FIG. 6. The screw member 132 cooperates with the bottom 183 of the socket 182 and the bottom 146 of the cylindrical bore 142 to limit the travel of the cable 106 and correspondingly limit the travel of the support member 30. Specifically, continued rotation of the knob 136 in a clockwise direction pulls the screw member 132 toward the knob 136 until ultimately the screw 132 engages the bottom surface 183 of the knob 136. Once this happens, the knob 136 will no longer turn as the bottom surface 183 functions as a positive step to limit travel of the screw member 132. Conversely, when rotating the knob 136 in a counterclockwise direction, the screw member 132 will move towards and ultimately engage the bottom surface 146 of the cylindrical bore 142 located in the housing 130. Once again, bottom surface 146 of the cylindrical bore 142 functions as a stop to limit travel of the screw member 132. Accordingly, the actuator 32 of the present invention has a positive stop on both ends thereby limiting travel and reducing the opportunity for the operator or occupant to over torque the adjustment cable 34 or pull the lumbar support member 30 past a point of maximum deflection.

Accordingly, the present invention provides a lumbar support mechanism 10 including a lumbar support member 30 connected to an actuator 32 used to position the lumbar support member 30 and a multitude of various positions.

What is claimed is:

1. A lumbar support mechanism for use with a seat comprising:
    a support member, said support member including a panel having an upper end, a lower end and a rear surface, a rib, the entire rib located on and projecting outward from the rear surface of said panel, said rib located on a line extending between said upper end and said lower end;
    a guide structure, said guide structure including a frame having upright leg members, said support member mounted on said guide structure;
    an actuator; and
    an adjustment cable, one end of said cable connected to said actuator and an other end of said cable connected to said support member.

2. A lumbar support mechanism as set forth in claim 1 including a spring connected at a first end to said upper end of said support member and at a second end to said support member, said spring operative to provide a tensile force on said support member to reduce a force necessary to move said support member towards an outwardly bowed position.

3. A lumbar support mechanism as set forth in claim 1 wherein said adjustment cable includes a cable and a cable housing, said cable disposed within said cable housing and having first and second ends, each of said ends extending beyond said cable housing, said first end of said cable having a hook attached thereto, and said second end of said cable attached to a screw member of said actuator, said hook operative to connect said first end of said cable to an upper flange.

4. A lumbar support mechanism as set forth in claim 1 wherein said support member includes a plurality of openings, said openings having a variable size and shape to aid in controlling flexibility of the support member.

5. A lumbar support mechanism as set forth in claim 1 wherein said support member includes an upper flange and a lower flange, said upper flange slidably secured to said upright leg members.

6. A lumbar support mechanism as set forth in claim 5 wherein said upper flange includes a plurality of apertures, said upright leg members slidably received in said apertures; and
    said lower flange including a plurality of apertures, said upright leg members received in said apertures in said lower flange.

7. A lumbar support mechanism as set forth in claim 5 including:
    at least one fastener engaging said guide structure, said fastener used for securing said guide structure to the seat.

8. A lumbar support mechanism as set forth in claim 7 including:
   said frame of said guide structure having a base member connected to said upright leg members;
   said fastener engaging said base member to secure said guide structure to the seat; and
   said upright leg members having a bend wherein said lower flange of said support member engages said bend.

9. A lumbar support mechanism as set forth in claim 1 wherein said rib includes at least one indentation, said indentation having a configuration that aids in controlling flexibility of the support member.

10. A lumbar support mechanism as set forth in claim 9 wherein said support member includes a plurality of openings, said openings having a variable size and shape to aid in controlling flexibility of the support member.

11. A lumbar support mechanism as set forth in claim 1 wherein said actuator includes:
   a housing having a cylindrical bore and a socket;
   a screw member having a post portion disposed within said socket, said screw member further including a threaded portion, said screw member disposed in said housing such that said post portion is disposed within said socket;
   a shell, said shell including an interior threaded surface, said shell disposed within said cylindrical bore wherein the threaded portion of said screw member engages the interior threaded surface of said shell; and
   a knob, said knob engaging said shell.

12. A lumbar support mechanism as set forth in claim 11 wherein said knob includes a latch assembly, said latch assembly engaging an annular groove on said housing such that said the knob is rotatably secured to said housing.

13. A lumbar support mechanism as set forth in claim 12 including:
   said knob having a cylindrical bore including at least one inwardly extending rib;
   said shell having at least one groove located in an outer circumferential surface of said shell, said groove cooperating with said rib when said shell is inserted into said cylindrical bore of said knob to couple said shell to said knob such that rotation of said knob causes rotation of said shell.

14. A lumbar support mechanism for use with a seat comprising:
   a support member, said support member including a panel having an upper end, a lower end and a rear surface, a rib located on and projecting outward from the rear surface of said panel, said rib oriented on a line extending between said upper end and said lower end;
   a guide structure, said guide structure including a frame having upright leg members, said support member mounted on said guide structure;
   an actuator said actuator including a housing, a screw member disposed within said housing and a knob; said knob including a latch assembly engaging a groove located in the outer surface of said housing such that rotation of said knob causes movement of said screw member within said housing;
   said actuator including a stop limiting the movement of said screw member within said housing; and
   an adjustment cable, said adjustment cable including a cable and a cable housing, one end of said cable connected to said screw member and an other end of said cable connected to said support member.

15. A lumbar support mechanism as set forth in claim 14 including first and second stops, said first stop being a bottom surface of a cylindrical bore located in said housing and said second stop being a bottom surface of a socket located in said knob.

16. A lumbar support mechanism as set forth in claim 14 wherein said rib includes an inwardly extending indentation, said indentation configured to vary flexibility of said support member.

17. A lumbar support mechanism as set forth in claim 14 including a plurality of openings located in said panel of said support member.

18. A lumbar support mechanism as set forth in claim 14 including:
   an upper flange extending rearwardly from said upper end of said panel;
   a lower flange extending rearwardly from said lower end of said panel; and
   said upper flange and said lower flange having mounting apertures located therein for securing said support member to said upright leg members of said guide structure, said mounting apertures including a slot extending inwardly from an outer face of said upper and lower flanges and a cylindrically shaped seat.

19. A lumbar support mechanism as set forth in claim 14 including a spring connected at a first end to said upper end of said support member and at a second end to said support member, said spring operative to provide a tensile force on said support member to reduce a force necessary to move said support member towards an outwardly bowed position.

20. A lumbar support mechanism for use with a seat comprising:
   a guide structure, said guide structure including a frame having upright leg members;
   a support member, said support member including a panel having an upper end, a lower end and a rear surface, a rib, said entire rib located on and projecting outward from the rear surface of said panel, said rib oriented on a line extending between said upper end and said lower end, said support member further having a plurality of openings and an upper flange and a lower flange, said upper flange including mounting apertures for securing said support member to said upright leg members;
   an actuator said actuator including a housing, said housing having a cylindrical bore and a socket;
   a screw member, said screw member having a threaded portion and a post
   portion, said screw member disposed within said housing such that said post portion is positioned in said socket;
   a shell, said shell including an interior threaded surface, said shell disposed within said cylindrical bore and about the threaded portion of said screw member such that the threaded portion of said screw member engages the interior threaded surface of said shell;
   a knob, said knob rotatably connected to said housing and engaging said shell such that rotation of said knob causes rotation of said shell and correspondingly movement of said screw member within said housing; and
   an adjustment cable, said adjustment cable including a cable and a cable housing, one end of said cable connected to said screw member and an other end of said cable connected to said upper end of said support member.

21. A lumbar support mechanism as set forth in claim 20 including a spring connected at a first end to said upper end of said support member and at a second end to said support member, said spring operative to provide a tensile force on said support member to reduce the force necessary to move said support member towards an outwardly bowed position.

22. A lumbar support mechanism as set forth in claim 21 including first and second stops, said first stop being a bottom surface of a cylindrical bore located in said housing and said second stop being a bottom surface of a socket located in said knob.

23. A lumbar support mechanism as set forth in claim 20 wherein said rib includes at the least one indentation, said the indentation having a configuration that aids in controlling the flexibility of the support member.

* * * * *